US008821830B2

(12) United States Patent
Li et al.

(10) Patent No.: US 8,821,830 B2
(45) Date of Patent: Sep. 2, 2014

(54) URCHIN-LIKE COPPER OXIDE MATERIAL MANUFACTURING METHOD

(75) Inventors: Yuan-Yao Li, Chia-Yi (TW); Tai-Hsun Chang, Taipei (TW)

(73) Assignee: National Chung Cheng University, Chia-Yi (TW)

( * ) Notice: Subject to any disclaimer, the term of this patent is extended or adjusted under 35 U.S.C. 154(b) by 393 days.

(21) Appl. No.: 13/440,414

(22) Filed: Apr. 5, 2012

(65) Prior Publication Data

US 2013/0183228 A1    Jul. 18, 2013

(30) Foreign Application Priority Data

Jan. 13, 2012   (TW) .............................. 101101469 A

(51) Int. Cl.
    *C01G 3/02*           (2006.01)

(52) U.S. Cl.
    USPC .......................... 423/604; 428/402; 423/632

(58) Field of Classification Search
    USPC ................................................ 428/402, 632
    See application file for complete search history.

(56) References Cited

U.S. PATENT DOCUMENTS

| | | | | |
|---|---|---|---|---|
| 5,547,748 A * | 8/1996 | Ruoff et al. | ................... | 428/323 |
| 8,440,162 B1 * | 5/2013 | Wong et al. | ................... | 423/598 |
| 2005/0021603 A1 * | 1/2005 | Yokomitsu et al. | ........... | 709/203 |
| 2012/0097888 A1 * | 4/2012 | Takabatake | ..................... | 252/75 |

OTHER PUBLICATIONS

Synthesis and characterization of nanosized urchin-like alpha Fe2O3 and Fe3O4; Microwave electromagentic and absrobing properties. Tong et al. Journal of Alloys and Compounds 509 (2011) 4320-4326.*
Carbon nanotubes prepared by anodic aluminum oxide template method. Hou et al. Chinese science bulletin. Jan. 2012. vol. 57.*
"Growth, Properties and Applications of Copper Oxide and Nickel Oxide/Hydroxide Nanostructures." By Almad Umar et al. in "Metal Oxide Nanostructures and their applications", date unknown. vol. 2, p. 1-39.*
CuO nanostructures:Synthesis, characterization, growth mechanisms, fundametnal preoperties, and applications. Qiabao Zhang et al. Progess in Materials Science 60 (2014) 208-337.*

* cited by examiner

*Primary Examiner* — Melvin C Mayes
*Assistant Examiner* — Colette Nguyen
(74) *Attorney, Agent, or Firm* — Muncy, Geissler, Olds & Lowe, P.C.

(57) ABSTRACT

An urchin-like copper oxide material manufacturing method, comprising following steps: providing copper powder of length about 5 to 150 μm; placing the copper powder on an aluminum oxide plate to be heated up; and heating up the aluminum oxide plate in a reaction temperature of 300° C. to 700° C., to obtain urchin-like copper oxide material on the aluminum oxide plate. By employing the manufacturing method, it only requires a simple thermal oxidation process to synthesize and obtain various types of urchin-like copper oxides having good stability and reproducibility, hereby achieving excellent performance in various opto-electronic applications.

9 Claims, 4 Drawing Sheets

URCHIN-LIKE COPPER OXIDE MATERIAL MANUFACTURING METHOD

BACKGROUND OF THE INVENTION

1. Field of the Invention

The present invention relates to a copper oxide material manufacturing method, and in particular to an urchin-like copper oxide material manufacturing method.

2. The Prior Arts

In an anhydrous environment containing no water, metal oxide can react directly with interface active ingredient (surfactant), to produce a precursor of metal-surfactant by adding adjuvant. When water is added into the reaction, the surfactant will align regularly and assemble spontaneously; while the metal oxide will pursue hydrolysis condensation reaction to form urchin-like structure.

According to the present documents, the urchin-like copper oxide is produced and synthesized through either a Simple Solution Process or a Hydrothermal Synthesis Process.

In the Simple Solution Process, 0.2M copper nitride and 2.0M sodium hydroxide strongly alkaline solution are mixed together, and are put into a three-neck reflow device to react under 90° C. Alternatively, 10 m mol copper nitride and 50 ml ethylene glycol mono-methyl ether made of 50 m ml are mixed together, and then put into a condenser for reflow reaction.

In the Hydrothermal Synthesis Process, 2 m mol copper chloride, 2 ml ethylene glycol, and 20 m mol of potassium hydroxide are put into a high pressure oven for reaction, and through changing concentrations of potassium hydroxide and reaction temperature, to change the surface appearance of copper oxide. Alternatively, a Microwave-Assisted Hydrothermal Synthesis is used to mix an equivalent amount of Cu ions with polyethylene glycol serving as organic additive for MAH reactions, so as to generate directional mesoscale self-assembly reactions and to form an urchin-like copper oxide structure.

Copper oxide is a p-type semiconductor, being advantageous of weather resistant, non-toxic, optically stable, and light shielding, thus it is widely utilized as coating material, gas and moisture sensitive material, and in absorption, catalysis, or electrochemical reactions. In the conventional technology, the manufacturing of urchin-like copper oxide involves a plurality of steps and complicated water solution preparation, in a specific atmosphere and environment. Besides, diameter and density of needle-like copper oxide elongations can not be controlled effectively.

Therefore, presently, the method of manufacturing urchin-like copper oxide structure is not quite satisfactory, and it has much room for improvements.

SUMMARY OF THE INVENTION

In view of the problems and drawbacks of the prior art, the present invention provides an urchin-like copper oxide material manufacturing method, so as to overcome the fore-mentioned problems.

A major objective of the present invention is to provide an urchin-like copper oxide material manufacturing method, which only requires a simple thermal oxidation method to synthesize the urchin-like copper oxide material in a single step. Compared with the prior art, it has the advantages of easy preparation and low production cost.

Another objective of the present invention is to provide an urchin-like copper oxide material manufacturing method, which produces a new urchin-like copper oxide structure, so that not only its needle-like elongations are sharp and distributed evenly on the entire nano-meter spherical surface, but a diameter of its needle-like elongations is limited to 30 to 100 nm.

A yet another objective of the present invention is to provide an urchin-like copper oxide material manufacturing method, such that it only requires a simple thermal oxidation to synthesize and obtain various types of urchin-like copper oxide material in a single step. Moreover, since its stability and reproducibility are pretty good, it achieves excellent performance in opto-electronic applications.

In order to achieve the above mentioned objective, the present invention provides an urchin-like copper oxide material manufacturing method, comprising following steps: firstly, providing copper powder; next, placing the copper powder on an aluminum oxide plate to be heated up; then, heating up the aluminum oxide plate in a reaction temperature of 300 to 700° C., to obtain an urchin-like copper oxide material.

According to one embodiment of the present invention, when heating up the aluminum oxide plate in a reaction temperature of 300 to 700° C., the duration of heating is from 6 to 48 hours.

According to another embodiment of the present invention, when heating up the aluminum oxide plate in a reaction temperature of 300 to 700° C. for 6 to 48 hours, an urchin-like copper oxide material is produced, having a diameter of needle-like elongations of 30 to 100 nm.

Therefore, according to the urchin-like copper oxide material manufacturing method of the present invention, for the urchin-like copper oxide material, density and length of nano-wires, and diameter of the needle-like elongations can be controlled through various reaction temperatures and reaction times.

Further scope of the applicability of the present invention will become apparent from the detailed descriptions given hereinafter. However, it should be understood that the detailed descriptions and specific examples, while indicating preferred embodiments of the present invention, are given by way of illustration only, since various changes and modifications within the spirit and scope of the present invention will become apparent to those skilled in the art from this detailed descriptions.

BRIEF DESCRIPTION OF THE DRAWINGS

The related drawings in connection with the detailed descriptions of the present invention to be made later are described briefly as follows, in which.

DETAILED DESCRIPTION OF THE PREFERRED EMBODIMENT

The purpose, construction, features, functions and advantages of the present invention can be appreciated and understood more thoroughly through the following detailed description with reference to the attached drawings.

The present invention provides a copper oxide manufacturing method, that is low in cost and simple in production process, and is capable of synthesizing nm-order urchin-like copper oxide material, without the need of going through the complicated hydrolysis-condensation process, hereby simplifying the producing process and reducing production costs effectively.

Figure 1:
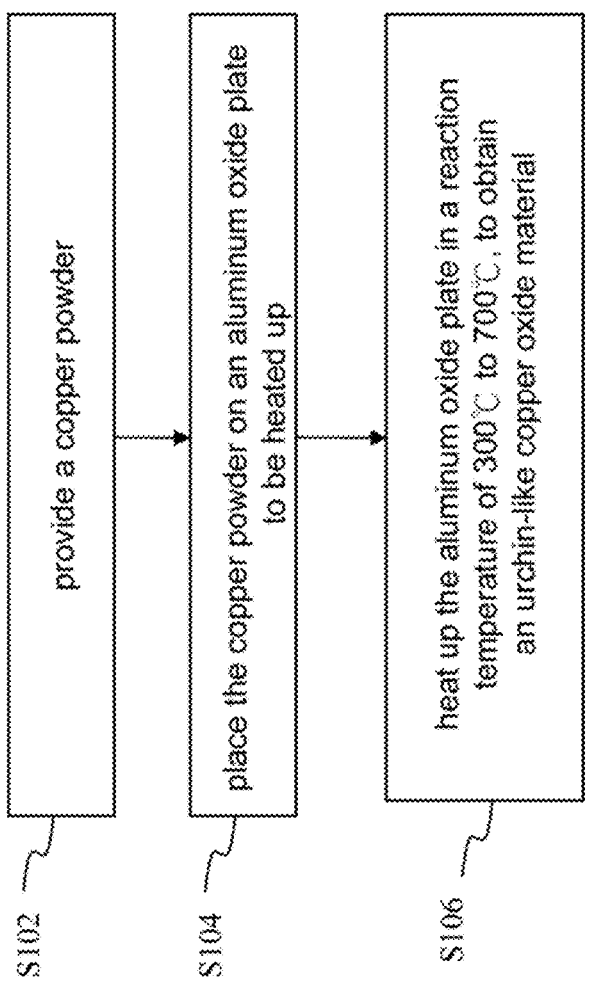
FIG. 1 is a flowchart of the steps of an urchin-like copper oxide material manufacturing method according to an embodiment of the present invention.
Figure 2A:
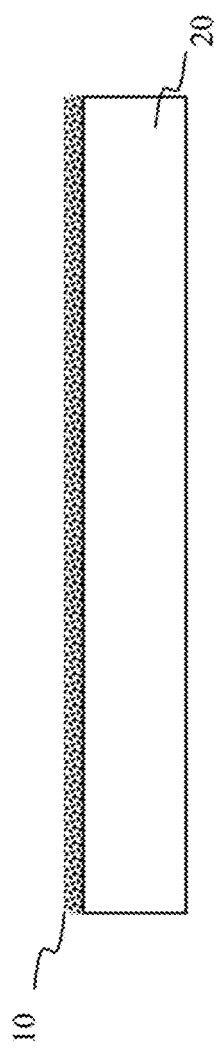
FIG. 2A is a schematic diagram of copper powder distributed evenly on an aluminum oxide plate according to an embodiment of the present invention.
Figure 2B:
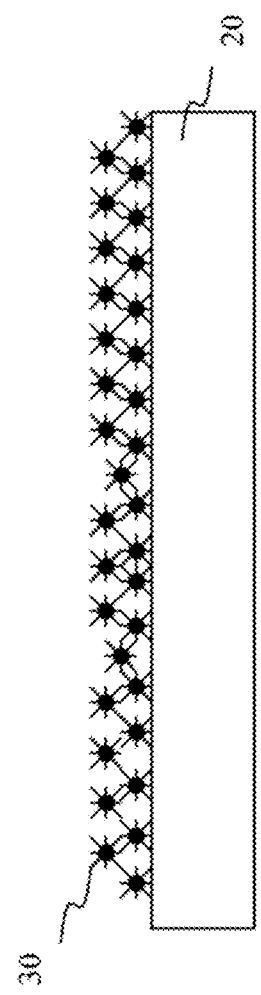
FIG. 2B is a schematic diagram of forming an urchin-like copper oxide material on an aluminum oxide plate according to an embodiment of the present invention.

Refer to FIG. 1 for a flowchart of the steps of an urchin-like copper oxide material manufacturing method according to an embodiment of the present invention. The method of the present invention mainly comprises steps S102 to S106. In the following, please also refer to FIGS. 2A and 2B for explaining details of the present invention.

Referring to steps S102 to S104 of FIG. 1, firstly, the present invention provides a copper powder 10. According to an embodiment of the present invention, the copper powder 10 of size from 5 μm to 100 μm can be used to produce urchin-like copper oxide material. Next, before the copper powder 10 is utilized, its surface can be grinded smooth and even through using a Ball Mill Device. Later, it is ready for being put onto an aluminum oxide plate, and waits to be heated.

According to another embodiment of the present invention, in addition to putting irregular-shaped copper powder 10 into a Ball Mill Device for processing, market available round shaped copper powder can also be utilized to produce an urchin-like copper oxide material.

In the descriptions mentioned above, in order to maintain a stable and constant temperature, the copper powder 10 can be distributed evenly on an aluminum oxide plate 20, so that each part of the copper powder 10 can be heated up evenly.

Subsequently, as shown in step S106, in the present invention, reaction temperature of 300 to 700° C. is provided to heat up the aluminum oxide plate 20, so as to produce an urchin-like copper oxide material 30 thereon. In general, it is found in the present invention that in a temperature range of 300 to 700° C., the urchin-like copper oxide material can be produced, however, for lower reaction temperature, longer reaction time is required.

According to one embodiment of the present invention, the heat up duration can be controlled at a range of 6 to 48 hours. In other words, when performing step S106, the copper powder is heated up at a constant temperature in a range of 300 to 700° C., to conduct the thermal oxidation reaction. Along with the progress of processing time, the density of needle-like copper oxide elongations increases. Finally, in this constant temperature for about 6 to 48 hours, the copper oxide 30 is produced, to form into 3-D urchin-like shape.

Figure 3:
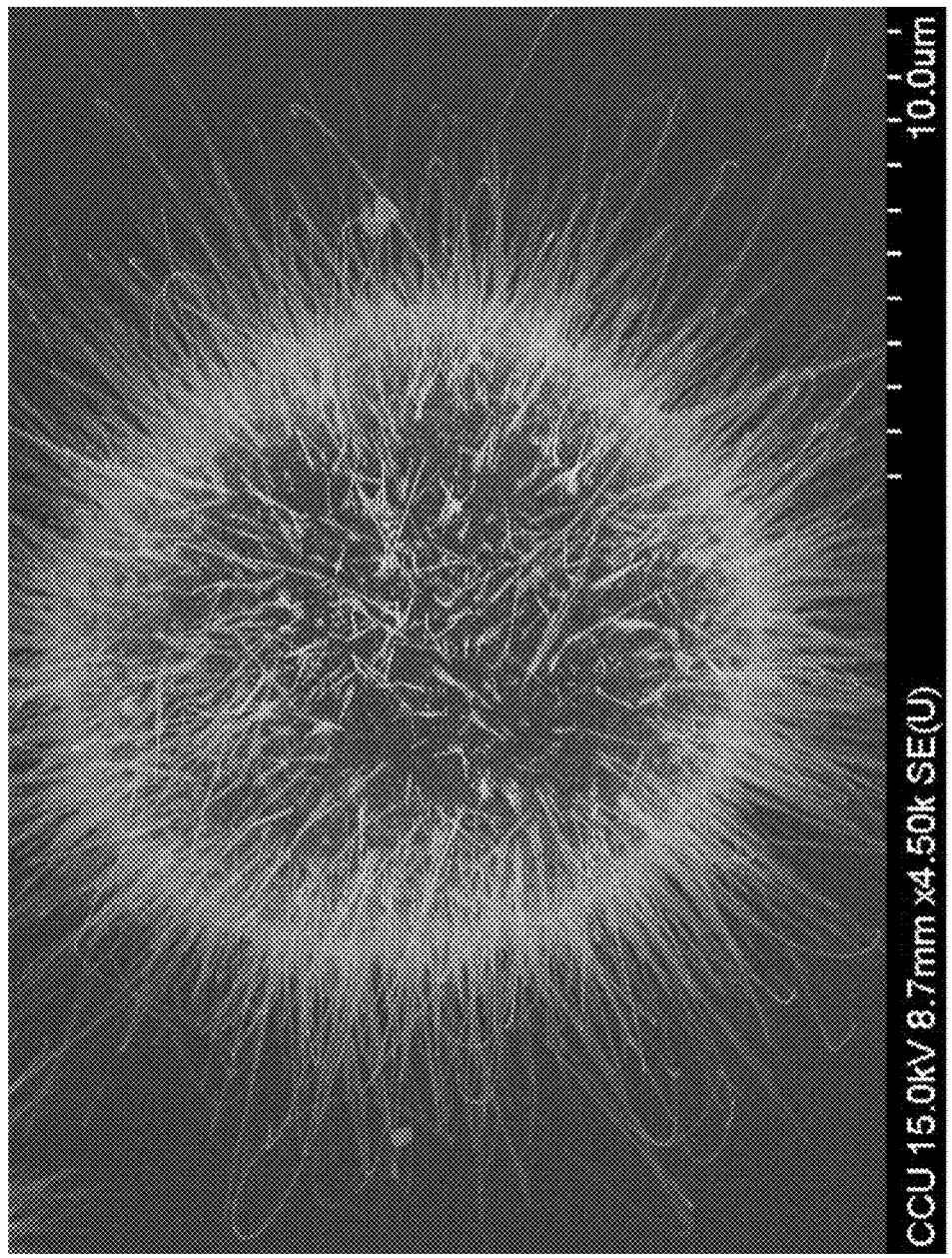
FIG. 3 is an image analysis graph of an urchin-like copper oxide material taken with Scanning Electron Microscope (SEM)
Figure 4:
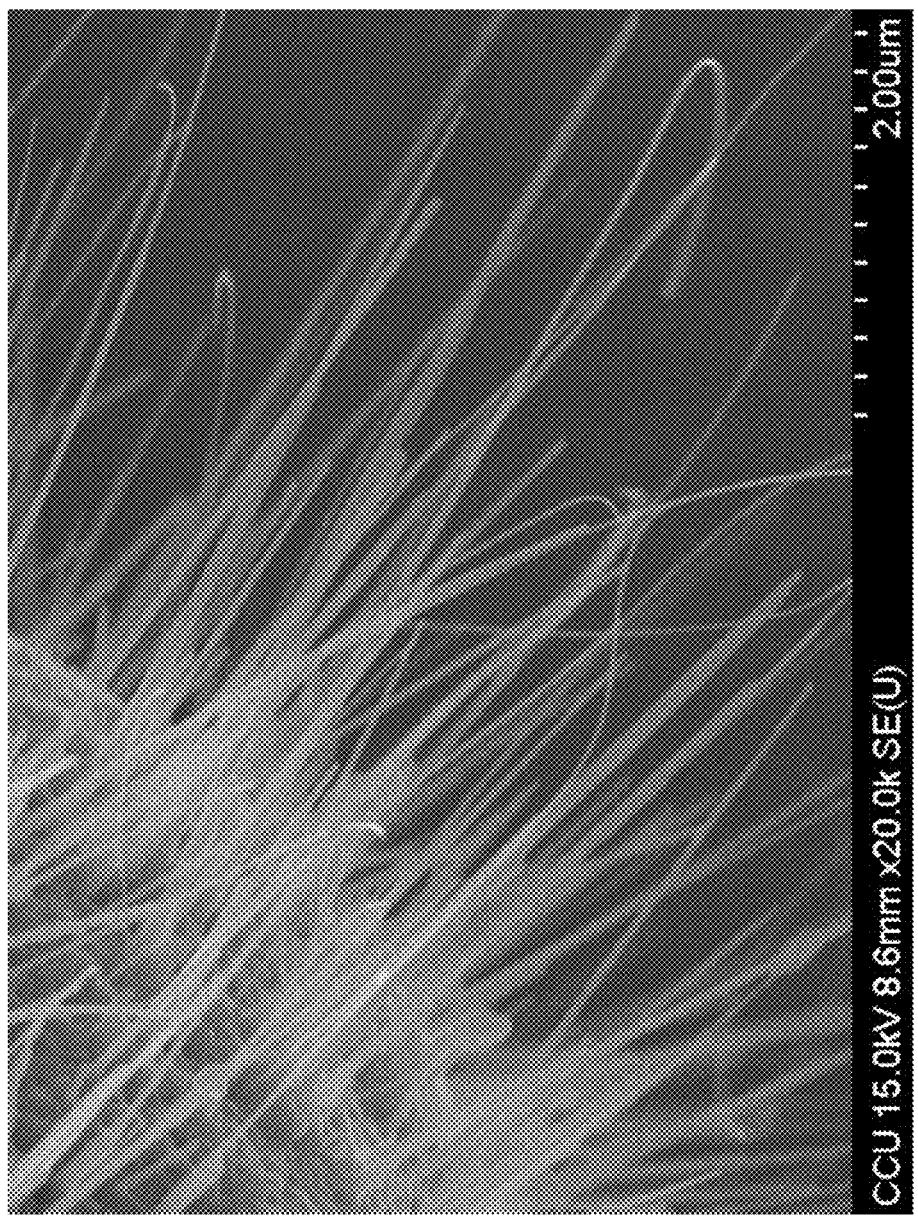
FIG. 4 is a partial enlarged view of a needle-like elongations for an urchin-like copper oxide material according to an embodiment of the present invention.

Refer to FIG. 3 for an image analysis graph of an urchin-like copper oxide material taken with Scanning Electron Microscope (SEM), and FIG. 4 for a partial enlarged view of a needle-like elongation for an urchin-like copper oxide material according to an embodiment of the present invention.

As shown in FIGS. 3 and 4, in the present invention, when copper powder is put onto aluminum oxide plate 20 and heated up in a temperature range of 300 to 700° C. for 6 to 48 hours, an urchin-like copper oxide material can be obtained. The diameter of needle-like elongation of this urchin-like copper oxide material is about 30 to 100 nm, with the length of needle-like elongation about 3 to 15 μm. The needle-like elongation can have higher length-to-width ratio, to achieve fairly good performance in various opto-electronic applications.

In addition, in the present invention, the production of an urchin-like copper oxide material is not limited to placing the copper powder 10 on an aluminum oxide plate 20 to heat up. According to another embodiment, the copper powder 10 can selectively be put on Indium Tin Oxide (ITO) glass or silicon wafer to heat up. When copper powder is put on the glass or silicon wafer mentioned above to heat up, it appears to show good adhesion to the glass or silicon wafer, meanwhile producing urchin-like copper oxide material having higher length-to-width ratio. As such, it can be effectively utilized in opto-electronic material, or other semiconductor elements.

Furthermore, compared with conventional method of synthesizing urchin-like copper oxide material, the method of the present invention is much simpler, since it requires only a single thermal oxidation step to accomplish the production purpose. In addition, in order to achieve mass production, in the present invention, a hot plate, a box-shaped or pipe-shaped high temperature oven can also be used to proceed with the heating up process of step S106.

In an embodiment of the present invention, when a hot plate is used to heat up aluminum oxide plate 20 for 6 to 48 hours, 5 grams of urchin-like copper oxide material can be obtained.

In the descriptions mentioned above, in case the hot plate is replaced with a box-shaped or pipe-shaped high temperature oven, and the copper powder and aluminum oxide plate are placed on multi-layer shelves in an oven to carry out the production, then the urchin-like copper oxide material thus produced can achieve uniformity in diameter, length, crystallinity, and appearance. Moreover, the amount of production can be increased from 5 g to 100 g. Then, if much more production amount is required, the volume of high temperature oven and flow of air can be increased to achieve larger scale production.

From the descriptions mentioned above, it can be known that, in the present invention, a simple thermal oxidation method is used to produce a new urchin-like copper oxide material. Through the detection of Scanning Electron Microscope (SEM), it can be observed that, the sharp needle-like copper oxide elongations are distributed in a radiation shape evenly on a micro-order spherical surface. Length of the needle-like copper oxide elongation is about 3 to 15 μm, diameter of the needle-like elongation is about 30 to 100 nm, and width at bottom of needle-like elongation is about several hundred nm, to form wire-shaped nano-meter structure.

Therefore, the urchin-like copper oxide material manufacturing method is simple in processing without the need of adding any solvent, while diameter of its needle-like elongation can be kept below 100 nm. In the present invention, for the urchin-like copper oxide material produced, the density, length of the nano-wires, and the diameter of the needle-like elongations can be controlled based on various reaction temperatures and durations. Also, the urchin-like copper oxide produced through this simple thermal oxidation method is of a single crystal structure having higher length-to-width ratio, and better crystallinity. As such, it can be used as low-cost cathode material of Field Emission Planar Display or high efficiency Light Emitting Device to achieve better performance.

Furthermore, the special geometric structure of urchin-like copper oxide makes it very suitable for the absorption of electromagnetic waves (frequency range from MHz to GHz), thus having a good competitive edge on the market.

The above detailed description of the preferred embodiment is intended to describe more clearly the characteristics and spirit of the present invention. However, the preferred embodiments disclosed above are not intended to be any restrictions to the scope of the present invention. Conversely, its purpose is to include the various changes and equivalent arrangements which are within the scope of the appended claims.

What is claimed is:

1. An urchin-like copper oxide material manufacturing method, comprising following steps:
   providing a copper powder;
   placing said copper powder on an aluminum oxide plate to be heated up; and
   heating up said aluminum oxide plate in a reaction temperature of 300° C. to 700° C., to obtain an urchin-like copper oxide material.

2. The urchin-like copper oxide material manufacturing method of claim 1, further comprising a step of grinding surface of said copper powder to be smooth by means of a ball mill device before providing said copper powder.

3. The urchin-like copper oxide material manufacturing method of claim 1, wherein said aluminum oxide plate is heated in the reaction temperature of 300° C. to 700° C. for 6 to 48 hours.

4. The urchin-like copper oxide material manufacturing method of claim 3, wherein upon heating up said aluminum oxide plate in the reaction temperature of 300° C. to 700° C. for 6 to 48 hours, said urchin-like copper oxide material is obtained having diameter of needle-like elongation about 30 to 100 nm.

5. The urchin-like copper oxide material manufacturing method of claim 3, wherein said step of heating up said aluminum oxide plate includes: placing said aluminum oxide plate on a hot plate to heat up.

6. The urchin-like copper oxide material manufacturing method of claim 5, wherein after heating up said aluminum oxide plate for 6 to 48 hours, about 5 g of said urchin-like copper oxide material is obtained.

7. The urchin-like copper oxide material manufacturing method of claim 3, wherein said step of heating up said aluminum oxide plate includes: placing said aluminum oxide plate in a box-shaped or pipe-shaped high temperature oven to heat up.

8. The urchin-like copper oxide material manufacturing method of claim 7, wherein after heating up said aluminum oxide plate in said box-shaped or pipe-shaped high temperature oven for 6 to 48 hours, 100 g of said urchin-like copper oxide material is obtained.

9. The urchin-like copper oxide material manufacturing method of claim 1, wherein said copper powder is distributed evenly on a surface of said aluminum oxide plate.

* * * * *